United States Patent
Sun (10) Patent No.: US 12,489,767 B2
(45) Date of Patent: Dec. 2, 2025

(54) DEVICE COMMUNICATION METHOD AND APPARATUS BASED ON MQTT PROTOCOL

(71) Applicant: ZTE Corporation, Shenzhen (CN)

(72) Inventor: Yimu Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 53 days.

(21) Appl. No.: 18/715,845

(22) PCT Filed: Dec. 1, 2022

(86) PCT No.: PCT/CN2022/135911
§ 371 (c)(1),
(2) Date: Jun. 3, 2024

(87) PCT Pub. No.: WO2023/098816
PCT Pub. Date: Jun. 8, 2023

(65) Prior Publication Data
US 2025/0039197 A1   Jan. 30, 2025

(30) Foreign Application Priority Data
Dec. 2, 2021 (CN) .......................... 202111467757.8

(51) Int. Cl.
*H04L 9/40* (2022.01)
*H04L 51/046* (2022.01)
*H04L 51/56* (2022.01)

(52) U.S. Cl.
CPC ........ *H04L 63/1416* (2013.01); *H04L 51/046* (2013.01); *H04L 51/56* (2022.05)

(58) Field of Classification Search
CPC ... H04L 63/1416; H04L 51/046; H04L 51/56; H04L 63/08; H04L 67/02; H04L 9/40; H04L 67/125; H04L 67/56; H04Q 9/00
See application file for complete search history.

(56) References Cited

U.S. PATENT DOCUMENTS 9,712,486 B2 *   7/2017   Johnson ................. H04W 4/70
9,781,189 B2 * 10/2017   Verzano ................. H04L 69/18
(Continued)

FOREIGN PATENT DOCUMENTS

| CN | 104980920 A | 10/2015 |
| CN | 108965447 A | 12/2018 |

(Continued)

OTHER PUBLICATIONS

Bruno Emmanuel et al: "Enforcing Access Controls in IoT Networks", Future Data and Security Engineering 2019, Nov. 20, 2019, pp. 429-445.

(Continued)

*Primary Examiner* — Backhean Tiv
(74) *Attorney, Agent, or Firm* — CANTOR COLBURN LLP (57) ABSTRACT

Provided are a device communication method and apparatus based on an MQTT protocol. The device communication method is performed by an MQTT topic management server and includes: receiving a first message reported by a controlled node, wherein the first message comprises a device Identifier (ID) of the controlled node; generating a random topic corresponding to the device ID of the controlled node, and returning the random topic to the controlled node; after authenticating a controlling node, sending the random topic to the controlling node, so that the controlling node and the controlled node perform MQTT protocol communication by using the random topic.

20 Claims, 4 Drawing Sheets

(56) References Cited

U.S. PATENT DOCUMENTS

| | | | |
|---|---|---|---|
| 10,673,646 B1* | 6/2020 | Shinar | H04W 4/12 |
| 10,880,743 B1* | 12/2020 | Berzin | H04L 41/0806 |
| 10,943,005 B2* | 3/2021 | Chen | H04W 12/40 |
| 11,582,233 B2* | 2/2023 | Sharma | H04W 12/40 |
| 12,242,593 B1* | 3/2025 | Venkataramani | G06F 21/46 |
| 2012/0266222 A1* | 10/2012 | Klatsky | H04L 63/101 726/7 |
| 2013/0254856 A1* | 9/2013 | Krishan | H04L 63/083 726/6 |
| 2015/0222621 A1* | 8/2015 | Baum | H04L 63/0807 726/9 |
| 2016/0065653 A1* | 3/2016 | Chen | H04L 41/0813 715/735 |
| 2022/0159074 A1* | 5/2022 | Jiang | H04W 4/12 |
| 2022/0393883 A1* | 12/2022 | Panchamia | G06Q 20/38215 |
| 2022/0394028 A1* | 12/2022 | Panchamia | H04L 63/123 |
| 2024/0333707 A1* | 10/2024 | Matsuda | H04L 67/145 |
| 2025/0039197 A1* | 1/2025 | Sun | H04L 67/56 |

FOREIGN PATENT DOCUMENTS

| | | |
|---|---|---|
| CN | 111274268 A | 6/2020 |
| CN | 112787979 A | 5/2021 |
| KR | 102093314 B1 | 3/2020 |

OTHER PUBLICATIONS

Extended European Search Report for Application No. 22900620.0, dated Feb. 17, 2025, 8 pages.

Fischer Marten et al: "Towards improving the Privacy in the MQTT Protocol", 2019 Global Iot Summit (GIOTS), IEEE, Jun. 17, 2019, pp. 1-6.

Gao Chao et al: "SecT: A Lightweight Secure Thing-Centered IoT Communication System", 2018 IEEE 15th International Conference On Mobile Ad Hoc and Sensor Systems (MASS), IEEE, Oct. 9, 2018, pp. 46-54.

International Search Report for corresponding application PCT/CN2022/135911 filed Dec. 1, 2022; Mail date Feb. 24, 2023.

* cited by examiner

DEVICE COMMUNICATION METHOD AND APPARATUS BASED ON MQTT PROTOCOL

CROSS REFERENCE

This application is a National Stage Filing of the PCT International Application No. PCT/CN2022/135911 filed on Dec. 2, 2022, which claims priority to Chinese Application No. CN202111467757.8 Filed on Dec. 2, 2021, the entirety of which is herein incorporated by reference.

TECHNICAL FIELD

Embodiments of the present disclosure relate to the field of communications, and in particular, to a device communication method and apparatus based on a Message Queuing Telemetry Transport (MQTT) protocol.

BACKGROUND

The MQTT protocol is a communication protocol for the Internet of Things. As a real-time communication protocol with low-cost and low bandwidth occupation, the MQTT protocol has a wide range of applications in the Internet of Things, small-scale devices, mobile applications, and other fields.

In IoT systems, there is often a need for point-to-point device configuration/information query. The MQTT protocol is based on a Publish/Subscribe mode, and under the Publish/Subscribe mode, two IoT nodes with communication needs often communicate through agreed-upon topics.

In this mechanism, if there is a malicious MQTT node in the network that knows the agreed-upon topics, this malicious MQTT node can steal private information by subscribing to specific topics, or publish incorrect configuration information to specific topics. This poses a significant information security risk.

Currently, common practices to prevent such security issues include prohibiting malicious nodes from accessing the MQTT network. For example, a bidirectional authentication function of the Transport Layer Security (TLS) protocol may be applied at the lower layer of the MQTT protocol to ensure that only legitimate devices are allowed to access the MQTT network. However, this solution has the following drawbacks.

1. If software of IoT devices is cracked, malicious devices can also pass the authentication and access the MQTT network by extracting a corresponding authentication certificate.
2. Network attackers can invade, through other network services of IoT devices, the IoT devices that have already accessed the MQTT network, so as to achieve the purpose of maliciously infiltrating the MQTT network.

SUMMARY

The embodiments of the present disclosure provide a device communication method and apparatus based on an MQTT protocol, which may at least solve the problem of security risks in device communication based on the MQTT protocol in the related art.

According to an embodiment of the present disclosure, a device communication method based on an MQTT protocol performed by an MQTT topic management server is provided. The device communication method includes: receiving, by an MQTT topic management server, a first message reported by a controlled node, wherein the first message includes a device Identifier (ID) of the controlled node; generating, by the MQTT topic management server, a random topic corresponding to the device ID of the controlled node, and returning, by the MQTT topic management server, the random topic to the controlled node; and after authenticating a controlling node, sending, by the is MQTT topic management server, the random topic to the controlling node, so that the controlling node and the controlled node perform MQTT protocol communication by using the random topic.

In an exemplary embodiment, receiving, by the MQTT topic management server, the first message reported by the controlled node includes: receiving, by the MQTT topic management server, the first message reported by the controlled node by using a POST method of a Hyper Text Transfer Protocol (HTTP).

In an exemplary embodiment, generating, by the MQTT topic management server, the random topic corresponding to the device ID of the controlled node, and returning, by the MQTT topic management server, the random topic to the controlled node includes: invoking, by the MQTT topic management server, a random string generator to generate a first random string as the random topic, and caching, by the MQTT topic management server, a mapping between the device ID of the controlled node and the first random string; and returning, by the MQTT topic management server, the first random string to the controlled node.

In an exemplary embodiment, after returning, by the MQTT topic management server, the first random string to the controlled node, the device communication method further includes: sending, by the MQTT topic management server, a first subscribe message to an MQTT proxy server, wherein a subscription topic in the first subscribe message is a last will topic, and the last will topic includes the first random string and a fixed suffix.

In an exemplary embodiment, after returning, by the MQTT topic management server, the first random string to the controlled node, the device communication method further includes: sending, by the controlled node, an MQTT connect message to the MQTT proxy server, wherein a last will topic in the MQTT connect message includes the first random string and a fixed suffix.

In an exemplary embodiment, the device communication method further includes: after MQTT connection is successfully established, sending, by the controlled node, a second subscribe message to the MQTT proxy server, wherein a subscription topic in the second subscribe message is the first random string.

In an exemplary embodiment, before sending, by the MQTT topic management server, the random topic to the controlling node, the device communication method further includes: receiving, by the MQTT topic management server, an authentication message reported by the controlling node by using a POST method of a Hyper Text Transfer Protocol (HTTP), wherein the authentication message includes a user name and a password required for authentication of the controlling node; sending, by the MQTT topic management server, a first response message to the controlling node, wherein a Cookie is set in the first response message as an authentication flag; receiving, by the MQTT topic management server, a second message sent by the controlling node, wherein the second message includes the device ID of the controlled node and the Cookie set in the first response message; and determining, by the MQTT topic management server according to the Cookie in the second message, that a node sending the second message is the controlling node, searching, by the MQTT topic management server according to the device ID in the second message, for the first random string in the cached mapping between the device ID and the first random string, generating, by the MQTT topic management server, a second random string, and returning, by the MQTT topic management server, the first random string and the second random string to the controlling node.

In an exemplary embodiment, after returning the first random string and the second random string to the controlling node, the device communication method further includes: sending, by the controlling node, a third subscribe message to the MQTT proxy server, wherein a subscription topic in the third subscribe message is the second random string; and after receiving a successful subscription response from the MQTT proxy server, sending, by the controlling node, a first publish message to the MQTT proxy server, wherein an MQTT topic of the first publish message is the first random string, and message content of the first publish message includes a management message and the second random string.

In an exemplary embodiment, after receiving, by the MQTT proxy server, the first publish message, the device communication method further includes: forwarding, by the MQTT proxy server, the first publish message to the controlled node; after executing the management message according to the first publish message, sending, by the controlled node, a second publish message to the MQTT proxy server, wherein an MQTT topic of the second publish message is the second random string, and message content of the second publish message is a response to the management message; and after receiving the second publish message, forwarding, by the MQTT proxy server, the second publish message to the controlling node based on the MQTT topic being the second random string.

In an exemplary embodiment, the device communication method further includes: in a case where the MQTT proxy server detects that the controlled node is offline, sending, by the MQTT proxy server, a third publish message to all nodes subscribing to the last will topic, wherein message content of the third publish message indicates that the controlled node is offline.

In an exemplary embodiment, the device communication method further includes: after receiving the third publish message, deleting, by the MQTT topic management server according to the random topic, the cached mapping between the device ID of the controlled node and the first random string.

In an exemplary embodiment, the device communication method further includes: receiving, by the MQTT topic management server, an authentication message reported by the controlling node by using a POST method of a Hyper Text Transfer Protocol (HTTP), wherein the authentication message includes a user name and a password required for authentication of the controlling node; sending, by the MQTT topic management server, a first response message to the controlling node, wherein a Cookie is set in the first response message as an authentication flag; receiving, by the MQTT topic management server, a second message sent by the controlling node, wherein the second message includes the device ID of the controlled node and the Cookie set in the first response message; and determining, by the MQTT topic management server according to the Cookie in the second message, that a node sending the second message is the controlling node, searching, by the MQTT topic management server according to the device ID in the second message, for the first random string in the cached mapping between the device ID and the first random string, and in a case where the first random string is not found, sending, by the MQTT topic management server, a second response message to the controlling node, wherein message content of the second response message indicates that the controlled node is not found.

In an exemplary embodiment, after sending, by the MQTT topic management server, the second response message to the controlling node, the device communication method further includes: in a case where the controlling node detects, according to the received second response message, that the controlled node is offline, abandoning, by the controlling node, management over the controlled node.

According to another embodiment of the present disclosure, a device communication method based on an MQTT protocol performed by a controlled node is provided. The device communication method includes: reporting, by a controlled node, a first message to an MQTT topic management server, wherein the first message includes a device Identifier (ID) of the controlled node; receiving, by the controlled node, a random topic generated by the MQTT topic management server and corresponding to the device ID of the controlled node; and after a controlling node passes authentication of the MQTT topic management server and obtains the random topic from the MQTT topic management server, performing, by the controlled node, MQTT protocol communication with the controlling node by using the random topic.

According to another embodiment of the present disclosure, an MQTT topic management server is provided. The MQTT topic management server includes: a first reception module, configured to receive a first message reported by a controlled node, wherein the first message includes a device Identifier (ID) of the controlled node; a generation module, configured to generate a random topic corresponding to the device ID of the controlled node, and return the random topic to the controlled node; and an authentication module, configured to send the random topic to the controlling node after authenticating a controlling node, so that the controlling node and the controlled node perform MQTT protocol communication by using the random topic.

According to another embodiment of the present disclosure, a controlled node is provided. The controlled node includes: a sending module, configured to report a first message to a Message Queuing Telemetry Transport (MQTT) topic management server, wherein the first message includes a device Identifier (ID) of the controlled node; a second reception module, configured to receive a random topic generated by the MQTT topic management server and corresponding to the device ID of the controlled node; and a communication module, configured to perform, after a controlling node passes authentication of the MQTT topic management server and obtains the random topic from the MQTT topic management server, MQTT protocol communication with the controlling node by using the random topic.

According to yet another embodiment of the present disclosure, a computer-readable storage medium is provided. The computer-readable storage medium stores a computer program, wherein the computer program, when running on a processor, causes the processor to implement the operations in any one of the described method embodiments.

According to yet another embodiment of the present disclosure, an electronic device is provided. The electronic device includes a memory and a processor, wherein the memory stores a computer program, and the processor is configured to run the computer program so as to implement the operations in any one of the described method embodiments.

In the foregoing embodiments of the present disclosure, an MQTT topic of node communication is managed by an MQTT topic management server, and by randomizing the MQTT topic, a malicious network node cannot intercept or interfere with the node communication, thereby improving the security of the communication between nodes of an MQTT protocol network.

DETAILED DESCRIPTION

Hereinafter, the embodiments of the present disclosure will be described in detail with reference to the accompanying drawings and in conjunction with the embodiments.

It should be noted that, terms such as "first" and "second" in the specification, claims, and the accompanying drawings of the present disclosure are used to distinguish similar objects, but are not necessarily used to describe a specific sequence or order.

In an MQTT network, MQTT clients may subscribe to topics or publish messages to a specific topic. When an MQTT proxy server receives a message from an MQTT client published to a specific topic, the MQTT proxy server will forward this message to all other MQTT clients subscribed to that topic. This mechanism provides convenience for one-to-many communication, and also makes it easy for other MQTT clients to access information intended for one-to-one communication. Additionally, MQTT clients may register a "last will" (also referred to as "will" hereinafter) message with the MQTT proxy server. In the event that an MQTT client disconnects from the MQTT connection or stops responding to keep-alive messages, the MQTT proxy server will publish the registered "last will" message to the specified topic.

Accordingly, an embodiment of the present disclosure provides a device communication method based on an MQTT protocol. In the network environment to which the embodiments of the present disclosure are applied, an IoT device node (namely, a controlled node) and a management node (namely, a controlling node) both serve as MQTT clients to be connected to an MQTT proxy server to form an MQTT network.

In the embodiments, the IoT device node may be connected to an MQTT topic management server. The IoT device node may only report a device ID, and cannot acquire information from the MQTT topic management server. The management node may connect to the MQTT topic management server through a strong authentication method (e.g., username/password login), and may obtain, according to the device ID of the device that the management node wants to manage, an MQTT topic for secure communication.

Figure 1:
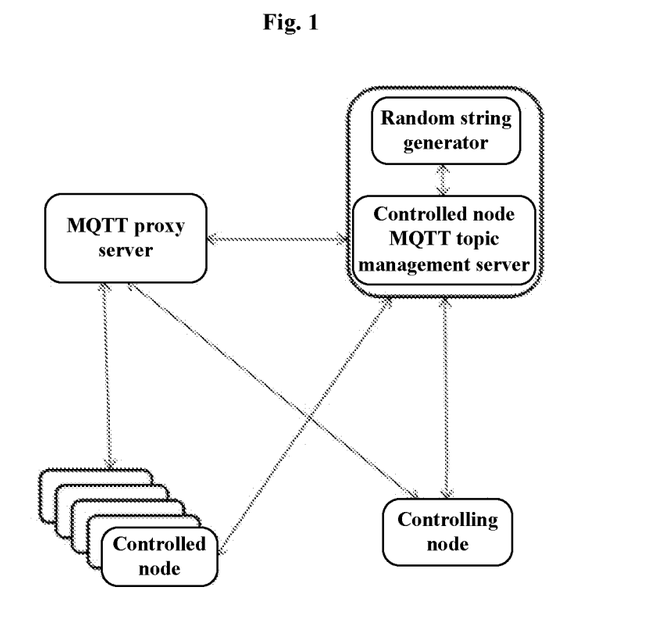
FIG. 1 is a schematic structural diagram of a network according to some embodiments of the present disclosure.

As shown in FIG. 1, the network architecture applied in the embodiments of the present disclosure is described as follows.

The MQTT proxy server is responsible for accepting MQTT connection and forwarding MQTT messages. The messages exchanged between the controlling nodes and the controlled nodes are forwarded by the MQTT proxy server.

The controlled node is generally an IoT device node, and receives configuration/information query from the controlling node.

The controlling node is generally a management background of the IoT device or a management controlled node (PP), and is responsible for management/information collection over the IoT device.

The MQTT topic management server is responsible for accepting an HTTP connection between the controlled node and the controlling node. The controlled node reports its own device ID by using a POST method of the HTTP, and the MQTT topic management server generates a corresponding random topic. The controlling node obtains the random topic corresponding to the device ID by using a GET method of the HTTP.

The random string generator is invoked by the MQTT topic management server and is responsible for generating a random MQTT topic, and ensuring that the generated random string is not repeated.

Figure 2:
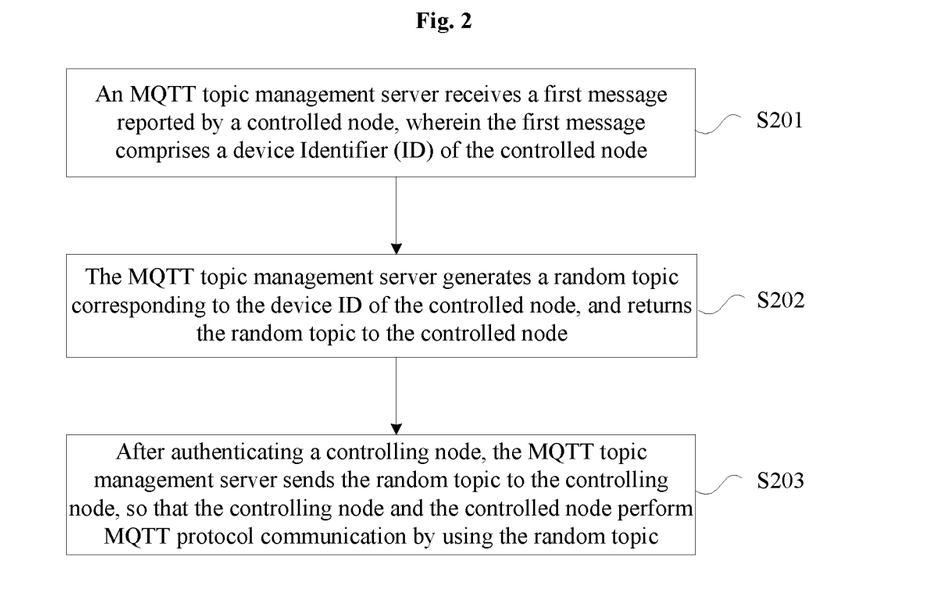
FIG. 2 is a flowchart of a device communication method based on an MQTT protocol according to some embodiments of the present disclosure.

The device communication method based on the MQTT protocol provided in the embodiments of the present disclosure may operate on the network architecture shown in FIG. 1. FIG. 2 is a flowchart of a device communication method based on an MQTT protocol according to some embodiments of the present disclosure. As shown in FIG. 2, the flow includes the following operations S201 to S203.

In operation S201, an MQTT topic management server receives a first message reported by a controlled node, wherein the first message includes a device Identifier (ID) of the controlled node.

In operation S202, the MQTT topic management server generates a random topic corresponding to the device ID of the controlled node, and returns the random topic to the controlled node.

In operation S203, after authenticating a controlling node, the MQTT topic management server sends the random topic to the controlling node, so that the controlling node and the controlled node perform MQTT protocol communication by using the random topic.

In an exemplary embodiment, the MQTT topic management server receives the first message reported by the controlled node by using a POST method of the HTTP.

In an exemplary embodiment, the MQTT topic management server invokes a random string generator to generate a first random string as the random topic, and caches a mapping between the device ID of the controlled node and the first random string; and the MQTT topic management server returns the first random string to the controlled node.

In an exemplary embodiment, after the MQTT topic management server returns the first random string to the controlled node, the MQTT topic management server sends a first subscribe message to an MQTT proxy server, wherein a subscription topic in the first subscribe message is a last will topic, and the last will topic includes the first random string and a fixed suffix.

In an exemplary embodiment, after the MQTT topic management server returns the first random string to the controlled node, the controlled node sends an MQTT connect message to the MQTT proxy server, wherein a last will topic in the MQTT connect message includes the first random string and a fixed suffix.

In an exemplary embodiment, the device communication method may further include the following operation. After MQTT connection is successfully established, the controlled node sends a second subscribe message to the MQTT proxy server, wherein a subscription topic in the second subscribe message is the first random string.

In an exemplary embodiment, before the MQTT topic management server sends the random topic to the controlling node, the device communication method may further include the following operations. The MQTT topic management server receives an authentication message reported by the controlling node by using a POST method of the HTTP, wherein the authentication message includes a user name and a password required for authentication of the controlling node; the MQTT topic management server sends a first response message to the controlling node, wherein a Cookie is set in the first response message as an authentication flag; the MQTT topic management server receives a second message sent by the controlling node, wherein the second message includes the device ID of the controlled node and the Cookie set in the first response message; and the MQTT topic management server determines, according to the Cookie in the second message, that a node is sending the second message is the controlling node, searches, according to the device ID in the second message, for the first random string in the cached mapping between the device ID and the first random string, generates a second random string, and returns the first random string and the second random string to the controlling node.

In an exemplary embodiment, after returning the first random string and the second random string to the controlling node, the device communication method may further include the following operations. The controlling node sends a third subscribe message to the MQTT proxy server, wherein a subscription topic in the third subscribe message is the second random string; and after receiving a successful subscription response from the MQTT proxy server, the controlling node sends a first publish message to the MQTT proxy server, wherein an MQTT topic of the first publish message is the first random string, and message content of the first publish message includes a management message and the second random string.

In an exemplary embodiment, after the MQTT proxy server receives the first publish message, the device communication method may further include the following operations. The MQTT proxy server forwards the first publish message to the controlled node; after executing the management message according to the first publish message, the controlled node sends a second publish message to the MQTT proxy server, wherein an MQTT topic of the second publish message is the second random string, and message content of the second publish message is a response to the management message; and after receiving the second publish message, the MQTT proxy server forwards the second publish message to the controlling node based on the MQTT topic being the second random string.

In an exemplary embodiment, the device communication method may further include the following operation: in a case where the MQTT proxy server detects that the controlled node is offline, the MQTT proxy server sends a third publish message to all nodes subscribing to the last will topic, wherein message content of the third publish message indicates that the controlled node is offline.

In an exemplary embodiment, the device communication method may further include the following operation: after receiving the third publish message, the MQTT topic management server deletes, according to the random topic, the cached mapping between the device ID of the controlled node and the first random string.

In an exemplary embodiment, the device communication method may further include the following operations. The MQTT topic management server receives an authentication message reported by the controlling node by using a POST method of a Hyper Text Transfer Protocol (HTTP), wherein the authentication message includes a user name and a password required for authentication of the controlling node; the MQTT topic management server sends a first response message to the controlling node, wherein a Cookie is set in the first response message as an authentication flag; the MQTT topic management server receives a second message sent by the controlling node, wherein the second message includes the device ID of the controlled node and the Cookie set in the first response message; and the MQTT topic management server determines, according to the Cookie in the second message, that a node sending the second message is the controlling node, searches, according to the device ID in the second message, for the first random string in the cached mapping between the device ID and the first random string, and in a case where the first random string is not found, the MQTT topic management server sends a second response message to the controlling node, wherein message content of the second response message indicates that the controlled node is not found.

In an exemplary embodiment, after the MQTT topic management server sends the second response message to the controlling node, the device communication method may further include the following operation: in a case where the controlling node detects, according to the received second response message, that the controlled node is offline, the controlling node abandons management over the controlled node.

In the foregoing embodiment of the present disclosure, an MQTT topic of node communication is managed by an MQTT topic management server, and by randomizing the MQTT topic, a malicious network node cannot intercept or interfere with the node communication, thereby improving the security of the communication between nodes of an MQTT protocol network.

Through the description of the foregoing embodiments, a person having ordinary skill in the art may clearly understand that the device communication method according to the foregoing embodiments may be implemented by software in addition to a necessary universal hardware platform, and definitely may also be implemented by hardware. However, in many cases, the former is a preferred implementation. Based on such understanding, the essence of the technical solution of the embodiments of the present disclosure or the part contributing to the related art may be embodied in the form of a software product. The computer software product is stored in a storage medium (such as a Read-Only Memory (ROM)/Random Access Memory (RAM), a magnetic disk, or an optical disc), and includes several instructions for enabling a terminal device (which may be a mobile phone, a computer, a server, or a network device) to execute the device communication method described in the embodiments of the present disclosure.

The embodiments of the present disclosure further provide an MQTT topic management server and a controlled node, which are configured to implement the foregoing embodiments and exemplary implementations, and what has been described is not repeated herein. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 3:
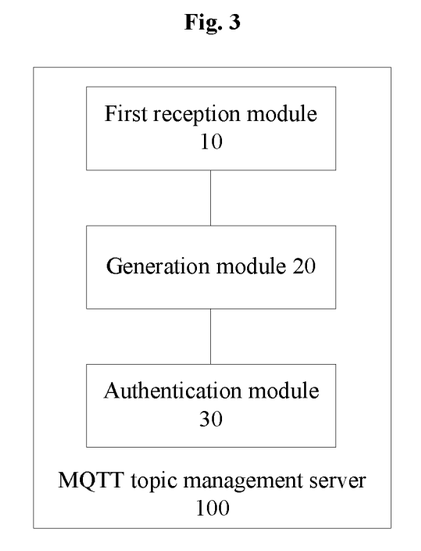
FIG. 3 is a structural block diagram of a MQTT topic management server according to some embodiments of the present disclosure.

FIG. 3 is a structural block diagram of a MQTT topic management server according to some embodiments of the present disclosure. As shown in FIG. 3, the MQTT topic management server 100 includes a first reception module 10, a generation module 20 and an authentication module 30.

The first reception module 10 is configured to receive a first message reported by a controlled node, wherein the first message includes a device Identifier (ID) of the controlled node.

The generation module 20 is configured to generate a random topic corresponding to the device ID of the controlled node, and return the random topic to the controlled node.

The authentication module 30 is configured to send the random topic to the controlling node after authenticating a controlling node, so that the controlling node and the controlled node perform MQTT protocol communication by using the random topic.

Figure 4:
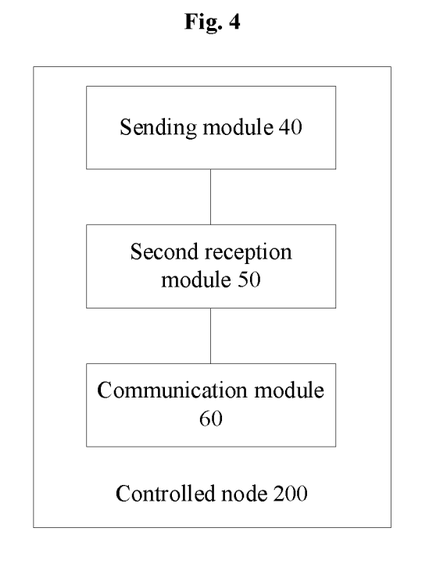
FIG. 4 is a structure diagram of a controlled node according to some embodiments of the present disclosure.

FIG. 4 is a structure diagram of a controlled node according to some embodiments of the present disclosure. As shown in FIG. 4, the controlled node 200 includes a sending module 40, a second reception module 50, and a communication module 60.

The sending module 40 is configured to report a first message to an MQTT topic management server, wherein the first message includes a device Identifier (ID) of the controlled node.

The second reception module 50 is configured to receive a random topic generated by the MQTT topic management server and corresponding to the device ID of the controlled node.

The communication module 60 is configured to perform, after a controlling node passes authentication of the MQTT topic management server and obtains the random topic from the MQTT topic management server, MQTT protocol communication with the controlling node by using the random topic.

It should be noted that each module may be implemented by software or hardware. The latter may be implemented in the following manner, but is not limited thereto. All the modules are located in a same processor; alternatively, the modules are located in different processors in an arbitrary combination.

To facilitate understanding of the technical solutions provided in the embodiments of the present disclosure, some exemplary embodiments under specific application scenarios are described in detail as follows.

Exemplary Embodiment 1

Figure 5:
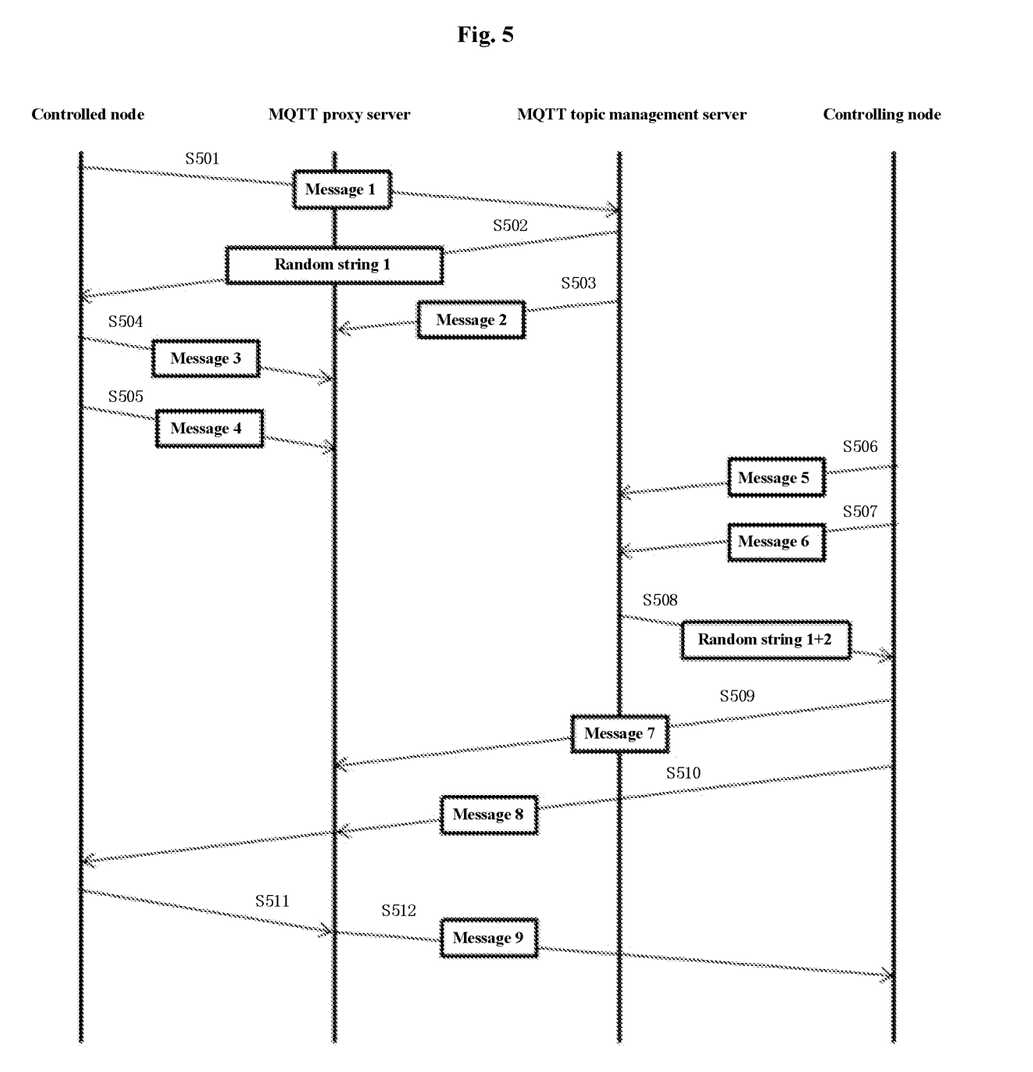
FIG. 5 is a flowchart of a communication method in a scenario where a controlled node is online according to some embodiments of the present disclosure.

The present exemplary embodiment provides a device communication method based on an MQTT protocol. In the present exemplary embodiment, a controlled node accesses an MQTT network and is managed by a controlling node. As shown in FIG. 5, the device communication method according to the present exemplary embodiment includes the following operations S501 to S512.

In operation S501, the controlled node sends an HTTP POST message (Message 1) to an MQTT topic management server. The HTTP POST message (Message 1) includes a device ID of the controlled node.

In operation S502, after receiving Message 1, the MQTT topic management server invokes a random string generator to generate random string 1, caches a mapping between the device ID and random string 1, and returns random string 1 to the controlled node as a response to Message 1.

In operation S503, the MQTT topic management server then sends an MQTT Subscribe message (Message 2) to the MQTT proxy server, and the subscription topic of the MQTT Subscribe message is: random string 1+"Last Will". For example, if the random string is "random String", then the subscription topic is "random String Last Will".

In operation S504, the controlled node receives the response to Message 1, sends an MQTT CONNECT message (Message 3) to the MQTT proxy server, and sets Will Topic in the MQTT CONNECT message as random string 1+"Last Will", and the Will Message is "offline".

In operation S505, after MQTT connection is successfully established, the controlled node sends an MQTT Subscribe message (Message 4) to the MQTT proxy server, and the subscription topic of the MQTT Subscribe message is random string 1.

In operation S506, the controlling node accesses the network and sends an HTTP POST message (Message 5) to the MQTT topic management server, wherein message content of the HTTP POST message is a user name/password required for authentication of the controlling node.

After receiving Message 5 and authenticating the username/password, the MQTT topic management server sets a Cookie in the response to Message 5 as an authentication flag.

In operation S507, the controlling node needs to establish a connection with the controlled node for management. First, the controlling node sends an HTTP POST message (Message 6) to the MQTT topic management server, wherein message content of the HTTP POST message includes the device ID of the controlled node and the Cookie returned in Message 5.

In operation S508, the MQTT topic management server receives Message 6, and recognizes, according to the Cookie in Message 6, that a node sending Message 6 is the controlling node, and then searches, according to the device ID in Message 6, for a corresponding random string 1 in the mapping between the device ID and random string 1 cached in the MQTT topic management server, and at the same time, generates random string 2, and returns random string 1 and random string 2 to the controlling node as a response to Message 6.

In operation S509, the controlling node sends an MQTT Subscribe message (Message 7) to the MQTT proxy server, and the subscription topic of the MQTT Subscribe message is random string 2.

In operation S510, after receiving a successful subscription response from the MQTT proxy server, the controlling node sends a MQTT Publish message (Message 8) to the MQTT proxy server, wherein the topic of the MQTT Publish message is random string 1, and message content of the MQTT Publish message is a management message+random string 2. The MQTT proxy server receives Message 8, and since the MQTT topic is random string 1, the MQTT proxy server forwards Message 8 to the controlled node according to the function of the MQTT protocol.

In operation S511, after receiving Message 8 and executing the management message, the controlled node sends a Publish message (Message 9) to the MQTT proxy server, the MQTT topic of the Publish message is random string 2, and the message content of the Publish message is a response to the management message.

In operation S512, the MQTT proxy server receives Message 9, and since the MQTT topic of Message 9 is random string 2, Message 9 will be forwarded to the controlling node according to the function of the MQTT protocol. After receiving Message 9, the controlling node completes the sending and receiving of the management message.

Examples of the messages in this exemplary embodiment are shown in Table 1.

TABLE 1

| Serial Number | Protocol | Request/ Response | Protocol Header Content | Message Body Content |
|---|---|---|---|---|
| 1 | HTTP | Request | Request Method: POST | {devID: abc} |
|  |  | Response |  | {randStr: 123456} |
| 2 | MQTT | Request | Message Type: SUBSCRIBE Topic: 123456LastWill |  |
| 3 | MQTT | Request | Message Type: CONNECT Will Topic: 123456LastWill Will msg: offline |  |
| 4 | MQTT | Request | Message Type: SUBSCRIBE Topic: 123456 |  |
| 5 | HTTP | Request | Request Method: POST | {user: admin, Pass: admin} |
|  |  | Response | Cookie: asdfghjkl |  |
| 6 | HTTP | Request | Request Method: POST Cookie: asdfghjkl | {devID: abc} |
|  |  | Response |  | {result: found, randStr1: 123456 randStr2: 654321} |
| 7 | MQTT | Request | Message Type: SUBSCRIBE Topic: 654321 |  |
| 8 | MQTT | Request | Message Type: PUBLISH Topic: 123456 | {MngContent: . . . , respTopic: 654321} |
| 9 | MQTT | Request | Message Type: PUBLISH Topic: 654321 | {MngContentResp: . . . } |

Exemplary Embodiment 2

This exemplary embodiment further provides a device communication method based on an MQTT protocol. The difference from Exemplary Embodiment 1 lies in that, in the current exemplary embodiment, the controlled node is offline, and the controlling node is not able to manage the controlled node.

In this exemplary embodiment, the initial state of each node is the state between operation S506 and operation S507 in Exemplary Embodiment 1. In this case, the initialization of the controlled node and the controlling node has been completed, but the controlling node has not started to connect to the controlled node.

Figure 6:
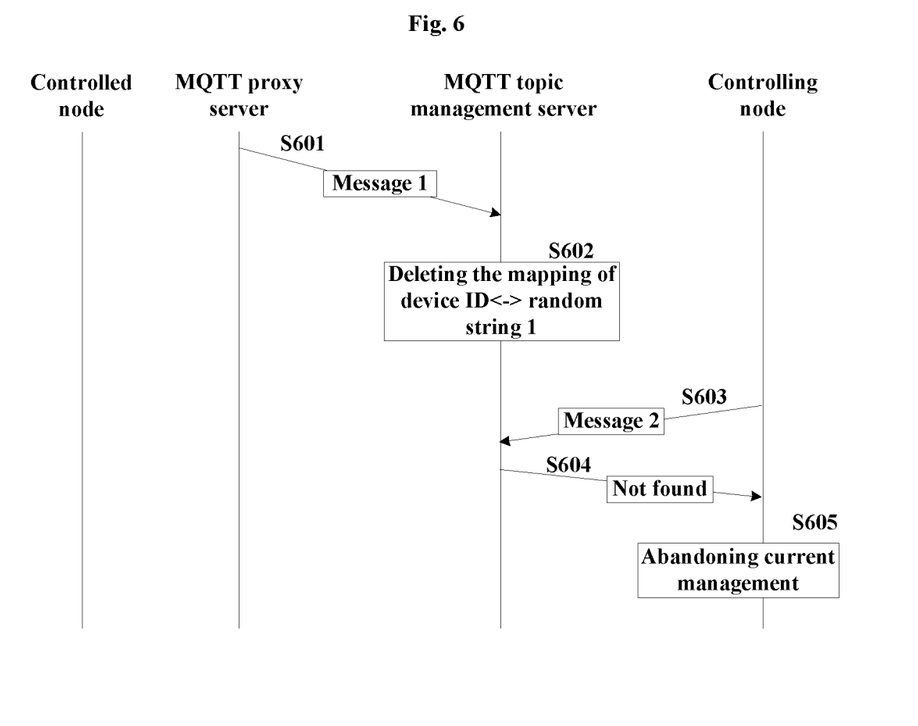
FIG. 6 is a flowchart of a communication method in a scenario where a controlled node is offline according to some embodiments of the present disclosure.

As shown in FIG. 6, the device communication method in this exemplary embodiment mainly includes the following operations S601 to S605.

In operation S601, the controlled node is offline, and according to the MQTT protocol, the MQTT proxy server detects that the controlled node is disconnected, and sends an MQTT Publish message (Message 1) to all nodes subscribing to the topic of random string 1+"LastWill", the content of the MQTT Publish message being "offline".

In operation S602, because the MQTT topic management server has subscribed to the topic of random string 1+"LastWill" in the process of the random topic of the controlled node, the MQTT topic management server can receive Message 1. The random MQTT topic management server deletes the mapping between the device ID and random string 1 according to the random topic 1.

In operation S603, the controlling node establishes a connection with the controlled node for management. The controlling node sends an HTTP POST message (Message 2) to the MQTT topic management server, wherein the message content of the HTTP POST message includes the device ID of the controlled node and an authenticated Cookie.

In operation S604, after receiving Message 2, the MQTT topic management server knows, according to the Cookie in Message 2, that the node that sends Message 2 is the controlling node, searches, according to the device ID in Message 2, for the corresponding random string 1 in the mapping between the device ID and random string 1 in the MQTT topic management server, but fails to find the corresponding random string 1, then the MQTT topic management server returns a response to Message 2, with the message content indicating that no device is found.

In operation S605, the controlling node receives the response to Message 2, detects that the controlled node is offline, and then abandons the management.

Examples of the messages in this exemplary embodiment are shown in Table 2.

TABLE 2

| Serial Number | Protocol | Request/ Response | Protocol Header Content | Message Body Content |
|---|---|---|---|---|
| 1 | MQTT | Request | Message Type: PUBLISH Topic: 123456LastWill | offline |
| 2 | HTTP | Request | Request Method: POST Cookie: asdfghjkl | {devID: abc} |
|  |  | Response |  | {result: NoFound} |

According to the described embodiments of the present disclosure, on the basis of an MQTT protocol network, a point-to-point secure communication solution is expanded, thereby fulfilling the demand for point-to-point secure communications of an IoT device in the MQTT network due to reasons such as configuration management/information collection.

The embodiments of the present disclosure further provide a computer-readable storage medium. The computer-readable storage medium stores a computer program, wherein the computer program, when running on a processor, causes the processor to implement the operations in any one of the described method embodiments.

In an exemplary embodiment, the computer-readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

The embodiments of the present disclosure also provide an electronic device, including a memory and a processor, wherein the memory stores a computer program, and the processor is configured to run the computer program so as to implement the operations in any one of the described method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device for execution with the computing devices. The shown or described operations may be executed in sequences different from those described here in some cases, or the modules or operations may be made into integrated circuit modules respectively, or multiple modules or operations therein may be made into a single integrated circuit module for implementation. Thus, the present disclosure is not limited to any specific combination of hardware and software.

The above description is only the exemplary embodiments of the present disclosure, and is not intended to limit the present disclosure. For those having ordinary skill in the art, the present disclosure may have various modifications and variations. Any modifications, equivalent replacements, improvements and the like made within the principle of the present disclosure shall belong to the protection scope of the present disclosure.

What is claimed is:

1. A device communication method based on a Message Queuing Telemetry Transport (MQTT) protocol, comprising:
   receiving, by an MQTT topic management server, a first message reported by a controlled node, wherein the first message comprises a device Identifier (ID) of the controlled node;
   generating, by the MQTT topic management server, a random topic corresponding to the device ID of the controlled node, and returning, by the MQTT topic management server, the random topic to the controlled node; and
   after authenticating a controlling node, sending, by the MQTT topic management server, the random topic to the controlling node, so that the controlling node and the controlled node perform MQTT protocol communication by using the random topic.

2. The device communication method according to claim 1, wherein receiving, by the MQTT topic management server, the first message reported by the controlled node comprises:
   receiving, by the MQTT topic management server, the first message reported by the controlled node by using a POST method of a Hyper Text Transfer Protocol (HTTP).

3. The device communication method according to claim 1, wherein generating, by the MQTT topic management server, the random topic corresponding to the device ID of the controlled node, and returning, by the MQTT topic management server, the random topic to the controlled node comprises:
   invoking, by the MQTT topic management server, a random string generator to generate a first random string as the random topic, and caching, by the MQTT topic management server, a mapping between the device ID of the controlled node and the first random string; and
   returning, by the MQTT topic management server, the first random string to the controlled node.

4. The device communication method according to claim 3, wherein after returning, by the MQTT topic management server, the first random string to the controlled node, the device communication method further comprises:
   sending, by the MQTT topic management server, a first subscribe message to an MQTT proxy server, wherein a subscription topic in the first subscribe message is a last will topic, and the last will topic comprises the first random string and a fixed suffix.

5. The device communication method according to claim 4, wherein after returning, by the MQTT topic management server, the first random string to the controlled node, the device communication method further comprises:
   sending, by the controlled node, an MQTT connect message to the MQTT proxy server, wherein a last will topic in the MQTT connect message comprises the first random string and a fixed suffix.

6. The device communication method according to claim 5, further comprising:
   after MQTT connection is successfully established, sending, by the controlled node, a second subscribe message to the MQTT proxy server, wherein a subscription topic in the second subscribe message is the first random string.

7. The device communication method according to claim 6, further comprising:
   in a case where the MQTT proxy server detects that the controlled node is offline, sending, by the MQTT proxy server, a third publish message to all nodes subscribing to the last will topic, wherein message content of the third publish message indicates that the controlled node is offline.

8. The device communication method according to claim 7, further comprising:
   after receiving the third publish message, deleting, by the MQTT topic management server according to the random topic, the cached mapping between the device ID of the controlled node and the first random string.

9. The device communication method according to claim 8, further comprising:
   receiving, by the MQTT topic management server, an authentication message reported by the controlling node by using a POST method of a Hyper Text Transfer Protocol (HTTP), wherein the authentication message comprises a user name and a password required for authentication of the controlling node;
   sending, by the MQTT topic management server, a first response message to the controlling node, wherein a Cookie is set in the first response message as an authentication flag;
   receiving, by the MQTT topic management server, a second message sent by the controlling node, wherein the second message comprises the device ID of the controlled node and the Cookie set in the first response message; and determining, by the MQTT topic management server according to the Cookie in the second message, that a node sending the second message is the controlling node, searching, by the MQTT topic management server according to the device ID in the second message, for the first random string in the cached mapping between the device ID and the first random string, and in a case where the first random string is not found, sending, by the MQTT topic management server, a second response message to the controlling node, wherein message content of the second response message indicates that the controlled node is not found.

10. The device communication method according to claim 9, wherein after sending, by the MQTT topic management server, the second response message to the controlling node, the device communication method further comprises:

in a case where the controlling node detects, according to the received second response message, that the controlled node is offline, abandoning, by the controlling node, management of the controlled node.

11. The device communication method according to claim 3, wherein before sending, by the MQTT topic management server, the random topic to the controlling node, the device communication method further comprises:

receiving, by the MQTT topic management server, an authentication message reported by the controlling node by using a POST method of a Hyper Text Transfer Protocol (HTTP), wherein the authentication message comprises a user name and a password required for authentication of the controlling node;

sending, by the MQTT topic management server, a first response message to the controlling node, wherein a Cookie is set in the first response message as an authentication flag;

receiving, by the MQTT topic management server, a second message sent by the controlling node, wherein the second message comprises the device ID of the controlled node and the Cookie set in the first response message; and determining, by the MQTT topic management server according to the Cookie in the second message, that a node sending the second message is the controlling node, searching, by the MQTT topic management server according to the device ID in the second message, for the first random string in the cached mapping between the device ID and the first random string, generating, by the MQTT topic management server, a second random string, and returning, by the MQTT topic management server, the first random string and the second random string to the controlling node.

12. The device communication method according to claim 11, wherein after returning the first random string and the second random string to the controlling node, the device communication method further comprises:

sending, by the controlling node, a third subscribe message to the MQTT proxy server, wherein a subscription topic in the third subscribe message is the second random string; and after receiving a successful subscription response from the MQTT proxy server, sending, by the controlling node, a first publish message to the MQTT proxy server, wherein an MQTT topic of the first publish message is the first random string, and message content of the first publish message comprises a management message and the second random string.

13. The device communication method according to claim 12, wherein after receiving, by the MQTT proxy server, the first publish message, the device communication method further comprises:

forwarding, by the MQTT proxy server, the first publish message to the controlled node;

after executing the management message according to the first publish message, sending, by the controlled node, a second publish message to the MQTT proxy server, wherein an MQTT topic of the second publish message is the second random string, and message content of the second publish message is a response to the management message; and after receiving the second publish message, forwarding, by the MQTT proxy server, the second publish message to the controlling node based on the MQTT topic being the second random string.

14. A Message Queuing Telemetry Transport (MQTT) topic management server, comprising a memory, a processor, and a computer program stored on the memory and capable of running on the processor, wherein the processor is configured to run the computer program to implement operations of the device communication method according to claim 1.

15. A non-transitory computer-readable storage medium, wherein the non-transitory computer-readable storage medium stores a computer program, and the computer program, when running on a processor, causes the processor to implement operations of the device communication method according to claim 1.

16. A device communication method based on a Message Queuing Telemetry Transport (MQTT) protocol, comprising:

reporting, by a controlled node, a first message to an MQTT topic management server, wherein the first message comprises a device Identifier (ID) of the controlled node;

receiving, by the controlled node, a random topic generated by the MQTT topic management server and corresponding to the device ID of the controlled node; and after a controlling node passes authentication of the MQTT topic management server and obtains the random topic from the MQTT topic management server, performing, by the controlled node, MQTT protocol communication with the controlling node by using the random topic.

17. A controlled node, comprising a memory, a processor, and a computer program stored on the memory and capable of running on the processor, wherein the processor is configured to run the computer program to implement operations of the device communication method according to claim 16.

18. A non-transitory computer-readable storage medium, wherein the non-transitory computer-readable storage medium stores a computer program, and the computer program, when running on a processor, causes the processor to implement operations of the device communication method according to claim 16.

19. The device communication method according to claim 16, reporting, by the controlled node, the first message to the MQTT topic management server comprises:

reporting, by the controlled node, the first message to the MQTT topic management server by using a POST method of a Hyper Text Transfer Protocol (HTTP).

20. A device communication method based on a Message Queuing Telemetry Transport (MQTT) protocol, comprising:

reporting, by a controlling node, an authentication message to an MQTT topic management server, wherein the authentication message comprises a user name and a password required for authentication of the controlling node;

receiving, by the controlling node, a random topic generated by the MQTT topic management server and corresponding to a device ID of a controlled node managed by the controlling node, and sent by the MQTT topic management server to the controlling node after the MQTT topic management server authenticates the controlling node; and performing, by the controlling node, MQTT protocol communication with the controlled node by using the random topic.

* * * * *